US011874917B2

(12) United States Patent
Greiner

(10) Patent No.: US 11,874,917 B2
(45) Date of Patent: Jan. 16, 2024

(54) SECURITY CODE SELECTION AND RECALL DEVICES AND METHODS THEREOF

(71) Applicant: Kenneth Edward Greiner, Canandaigua, NY (US)

(72) Inventor: Kenneth Edward Greiner, Canandaigua, NY (US)

( * ) Notice: Subject to any disclaimer, the term of this patent is extended or adjusted under 35 U.S.C. 154(b) by 447 days.

(21) Appl. No.: 17/365,514

(22) Filed: Jul. 1, 2021

(65) Prior Publication Data

US 2022/0004620 A1 Jan. 6, 2022

Related U.S. Application Data

(60) Provisional application No. 63/046,985, filed on Jul. 1, 2020.

(51) Int. Cl.
*G06F 21/46* (2013.01)
*G06K 19/06* (2006.01)
*H04L 9/08* (2006.01)

(52) U.S. Cl.
CPC ....... *G06F 21/46* (2013.01); *G06K 19/06028* (2013.01); *G06K 19/06037* (2013.01); *H04L 9/0861* (2013.01); *H04L 9/0863* (2013.01); *H04L 9/0866* (2013.01); *H04L 9/0877* (2013.01)

(58) Field of Classification Search
CPC ... H04L 9/0861; H04L 9/0863; H04L 9/0866; H04L 9/0877
See application file for complete search history.

(56) References Cited

U.S. PATENT DOCUMENTS

| 2016/0002952 A1* | 1/2016 | Yang | E05B 37/16 70/315 |
| 2018/0106072 A1* | 4/2018 | Wu | E05B 37/0034 |
| 2022/0307290 A1* | 9/2022 | Lin | E05B 37/02 |

FOREIGN PATENT DOCUMENTS

CA 2895597 12/2016

OTHER PUBLICATIONS https://russtopialabs.bigcartel.com/products (last accessed Jul. 1, 2021).
Weston, Anthony, "Ultra Pasword Cube", https://www.kickstarter.com/projects/1429475663/ultra-password-cube-mechanical-password-generator (last accessed Jul. 1, 2021).

* cited by examiner

*Primary Examiner* — Ellen Tran
(74) *Attorney, Agent, or Firm* — Troutman Pepper Hamilton Sanders LLP (Rochester)

(57) ABSTRACT

A device includes a viewfinder wheel with at least one viewfinder window, two or more code wheels rotatably coupled together with the viewfinder wheel about an axis, a plurality of characters, a plurality of code symbols, and a plurality of internal windows. The characters are spaced about a circumferential outer side of the viewfinder wheel and the code wheels. The code symbols are located in regions of a surface of each of the code wheels with each of the regions spaced out a different distance from the axis. The internal windows are in at least one of the code wheels adjacent the viewfinder wheel, wherein alignment of one of the characters of each of the viewfinder wheel and the code wheels at a key sequence location reveals through the viewfinder window and one or more of the internal windows a code sequence comprising a subset of the code symbols.

20 Claims, 10 Drawing Sheets

SECURITY CODE SELECTION AND RECALL DEVICES AND METHODS THEREOF

This application claims benefit of U.S. Provisional Patent Application No. 63/046,985, filed Jul. 1, 2020, the entirety of which is incorporated herein by reference.

FIELD

The technology relates to the field of information security, specifically to security-code selection and recall devices for user password selection and multi-factor authentication and methods thereof.

BACKGROUND

Passwords have become a daily headache for millions of information system users. Sound security practice encourages all consumers of secured systems to use unique passwords for each system, so that the compromise of one system does not lead to the insecurity of others. The recommended length of a password has grown from eight to fourteen characters to account for the increase in computational power available for brute force attacks. Further, users are encouraged to add digits, punctuation, special symbols and upper or lowercased letters to their passwords to satisfy security policies, making them difficult to remember. Users are strongly advised not to write passwords down; for fear that they might be discovered by a malicious snooper. The combination of these factors makes it impractical for the typical user to comply and remember numerous passwords. As a result they are often resetting forgotten passwords of infrequently used systems, which in itself can be a potential security risk.

Users that ignore these recommendations are indeed more vulnerable, and news of cracked accounts that belong to celebrities or organizations is common. Vulnerability often stems from the fact that individuals often either create a password that despite password policies is easy to guess, or they re-use an existing password from a system that is eventually compromised.

Various solutions have been created to ease the burden of creating, storing and recalling strong passwords. Web browsers aid users with password caches that are related to user names and web site URLs. Cloud hosted systems can be used to store passwords for a fee. Mobile applications implement vaults that use master passwords or pin codes to unlock what is essentially an encrypted copy of user names and passwords. While these are all admirable methods, they generally are all electronic and connected in some way, and are vulnerable to remote attacks and malicious software.

Therefore, there exists a need for secure offline storage of user credentials. Users can benefit from a method that can store a plurality of passwords, each unique to a given system, usually identified by an internet domain name or host name, while providing the necessary policy satisfying characters they require. Further, the discovery of the system should not disclose the user's credentials, assuming it is physical in nature.

It is also common practice to request users of secure information systems to supply a second factor authentication code before they are granted access. Typically such second factor codes come in one of two varieties: reflected codes; and time synchronized generated codes.

A reflected code is normally sent to a user via electronic means such as an SMS text message, email, or voice call. The user's duty is to parrot the same code back to the authority, who assumes that the initial code was sent over a communications channel that only the bona-fide user has access to. That is, they own the device that the SMS message was sent to, or they own the credentials to the email account that the email was sent to. The weakness with this system is apparent in that phone numbers can be ported with relative ease to an attacker's device. Email or other messaging accounts can be compromised, thus giving an attacker a remote attack vector. The attacker need not steal the actual physical phone, laptop or workstation from the user; they only need to gain control of their communication service accounts.

A better solution to the second-factor authentication problem is a time-synchronized code generator. In this case, each user is given an electronic system, which can be embodied in either a software program or dedicated piece of hardware that generates a unique sequence of pseudo-random codes periodically. The authority that issued the electronic system is able to verify at any given time what code a given user should be sending, and so there is no parroting of information. The security lies in the code generating algorithm and the authority's knowledge of the user's generator sequence, however provided. This certainly has security benefits, but also requires the use of an electronic device which may itself be compromised remotely.

Therefore a purely mechanical solution, not linked to an electronic network, capable of generating authentication codes could offer the added benefits of a device that cannot be compromised remotely and requires no electrical power. Physical theft or duplication of the device, or an untrustworthy issuing authority would be the only routes to a security breach.

SUMMARY

A security-code selection and recall device includes a viewfinder wheel with at least one viewfinder window, two or more code wheels rotatably coupled together with the viewfinder wheel about a common axis, a plurality of characters, a plurality of code symbols, and a plurality of internal windows. The plurality of characters are spaced about a circumferential outer side of each of the viewfinder wheel and the two or more code wheels. The plurality of code symbols are located in two or more regions of a surface of each of the code wheels with each of the regions spaced out a different distance from the common axis. The plurality of internal windows are in at least one of the code wheels adjacent the viewfinder wheel, wherein alignment of one of the characters of each of the viewfinder wheel and the two or more code wheels at a key sequence location reveals through the viewfinder window and one or more of the internal windows a code sequence comprising a subset of the code symbols.

A method for making a security-code selection and recall device includes providing a viewfinder wheel with at least one viewfinder window. Two or more code wheels are rotatably coupling together with the viewfinder wheel about a common axis. A plurality of characters are spaced about a circumferential outer side of each of the viewfinder wheel and the two or more code wheels. A plurality of code symbols are located in two or more regions of a surface of each of the code wheels with each of the regions being spaced out a different distance from the common axis. A plurality of internal windows are formed in at least one of the code wheels adjacent the viewfinder wheel, wherein alignment of one of the characters of each of the viewfinder wheel and the two or more code wheels at a key sequence location reveals through the viewfinder window and one or more of the internal windows a code sequence comprising a subset of the code symbols.

The claimed technology provides a number of advantages including providing a secure and easy to use security-code selection and recall device for applications, such as user password selection and multi-factor authentication by way of example. Examples of this technology center around a class of mechanical devices, generally comprising two or more interlocking wheels that rotate around the same axis, that contain a plurality of windows and opaque surfaces upon which code symbols including alphabetic, numeric, and/or symbolic characters are printed; the outer edge of each wheel is inscribed with alphabetic, numeric, and/or symbolic characters that may be used to build a key sequence. When the characters on the outer edge are aligned to form a useful key sequence, and the user views the surfaces of the wheels through a masking viewfinder, the device deterministically produces sequences of symbols that can be used as policy satisfying passwords, fragments of passwords or authentication codes.

In order to enhance the secure nature of the devices as a population it is desirable that the sequences generated by each device are for practical purposes, unique. Support for the manufacture of modest volumes of unique devices can be achieved through dual-extrusion FDM printing. At larger volumes, injection molded blanks of code wheels could be marked with precision lasers, or fitted with die cut adhesive labels printed with code symbols. Although not strictly necessary for all applications, it is expected that each device be labeled with a unique identifier known to the issuing authority; the sequence, and potentially the layout and types of symbols on each device, being unique to the identifier. This identifier, or a reference to it, being normally on the device, is intended to be referenced by the owner and the issuing authority in case a replacement or ownership confirmation is required.

Finally, examples of the technology include associated methods of registering ownership of devices and utilizing them in various authentication schemes, including but not limited to multi-factor authentication and third-party authentication methods such as OAuth2 and OpenID.

BRIEF DESCRIPTION OF THE DRAWINGS

These examples of this technology are illustrated are not limited by the figures of the accompanying drawings.

DETAILED DESCRIPTION

The present disclosure is to be considered as an exemplification of this technology, and is not intended to be limiting of this technology to the specific examples illustrated by the figures below. In particular, other examples of this technology may make use of a different number of facets or sides with possibly multiple key characters per facet, entirely different layouts of windows and surfaces using different symmetries to assure the effect of complete password policy satisfaction or authentication code validity, or different viewfinder designs to mask the code characters for a given key. Some examples may alternatively carry on their surfaces different alphabets, character sets, or machine readable content, depending on the application. The information systems paired with the mechanical device may contain additional actors, or be used in concert with other authentication schemes, not described or named here, but familiar to those skilled in the art of information security.

Examples of security-code selection and recall devices 10(1)-10(3) are illustrated in FIGS. 1-13. In this example, the chromatic displacement security-code selection and recall devices 10(1)-10(3) have one of the view finder wheels 12(1)-12(3) and two or more of the code wheels 14(1)-14(9), although the security-code selection and recall device could have other types and/or numbers of other components and/or other elements in other configurations as illustrated in the examples herein. The claimed technology provides a number of advantages including providing a secure and easy to use security-code selection and recall device for applications, such as user password selection and multi-factor authentication by way of example.

Referring more specifically to FIGS. 1-8b, an example of the security-code selection and recall device 10(1) is illustrated. In this example, the security-code selection and recall device 10(1) includes the viewfinder wheel 12(1) and the code wheels 14(1)-14(3), although again the security-code selection and recall device could have other types and/or numbers of other components and/or other elements, such as different viewfinder wheels and/or different code wheels, in other configurations.

Figure 11:
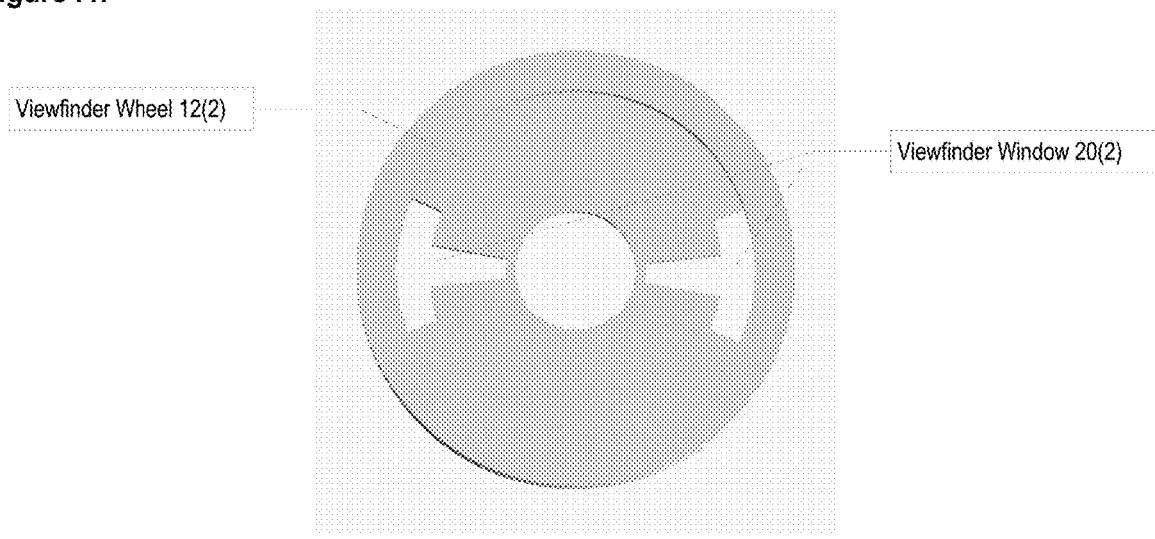
FIG. 11 is a top view of an example of an alternate viewfinder design, suitable for exposing ten code characters for the security-code selection and recall device shown in FIG. 9.
Figure 13:
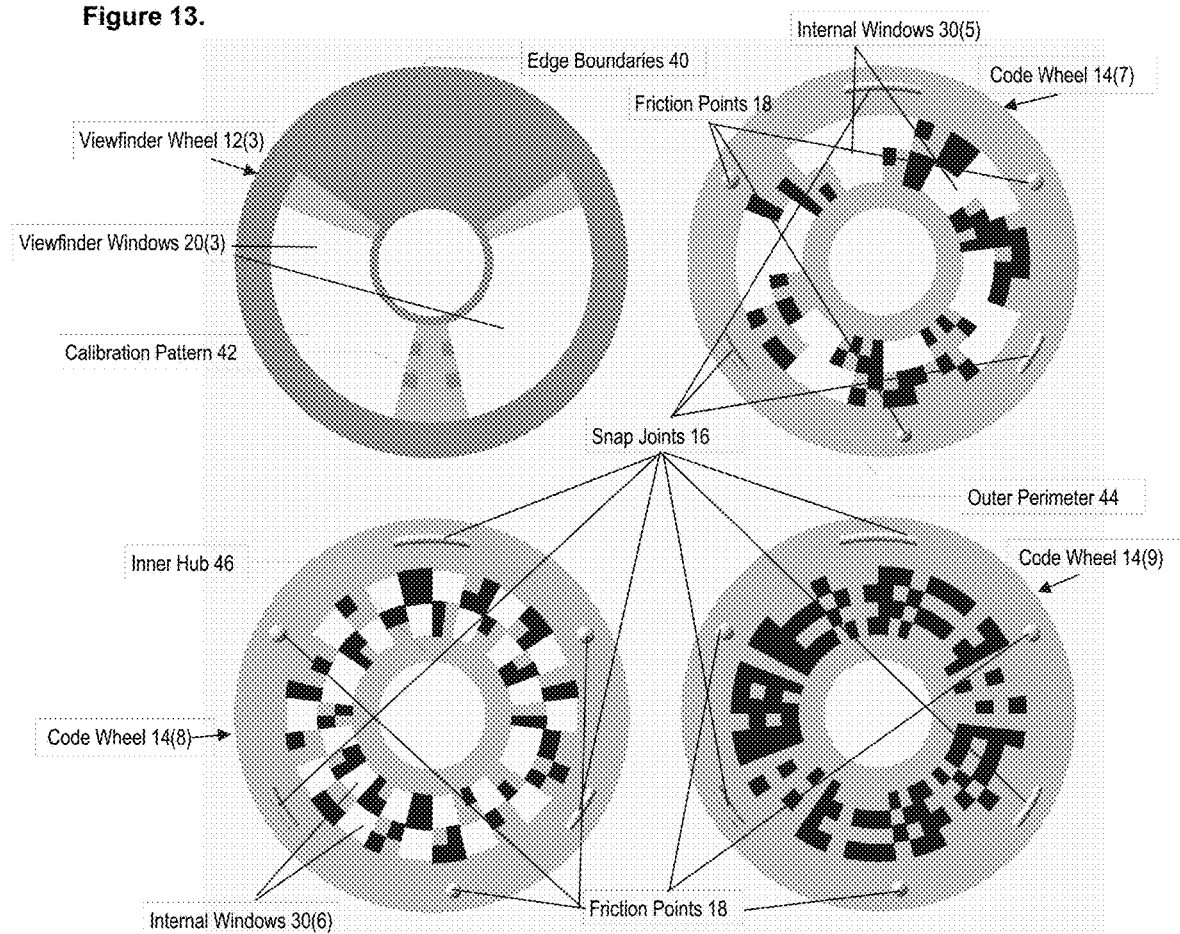
FIG. 13 is a top view of examples of the wheels of the example of the security-code selection and recall device shown in FIG. 12.

The viewfinder wheel 12(1) has a circular shape and is configured to be rotatably mounted on the code wheel 14(1), although other types of viewfinder wheels in other configurations may be used, such as a viewfinder wheel 12(2) shown in FIG. 11 and a viewfinder wheel 12(3) shown in FIG. 13 by way of example. The viewfinder wheel 12(1) also has a pair of viewfinder windows 20(1) which in this example have a trapezoidal shape and provide access to a secure and uniquely generated security code, although the viewfinder wheel can have other types and/or numbers viewfinder windows, such as a viewfinder windows 20(2) shown in FIG. 11 with a T-shape and a viewfinder windows 20(3) shown in FIG. 13 with partial semi-circle shape, by way of example.

Figure 1:
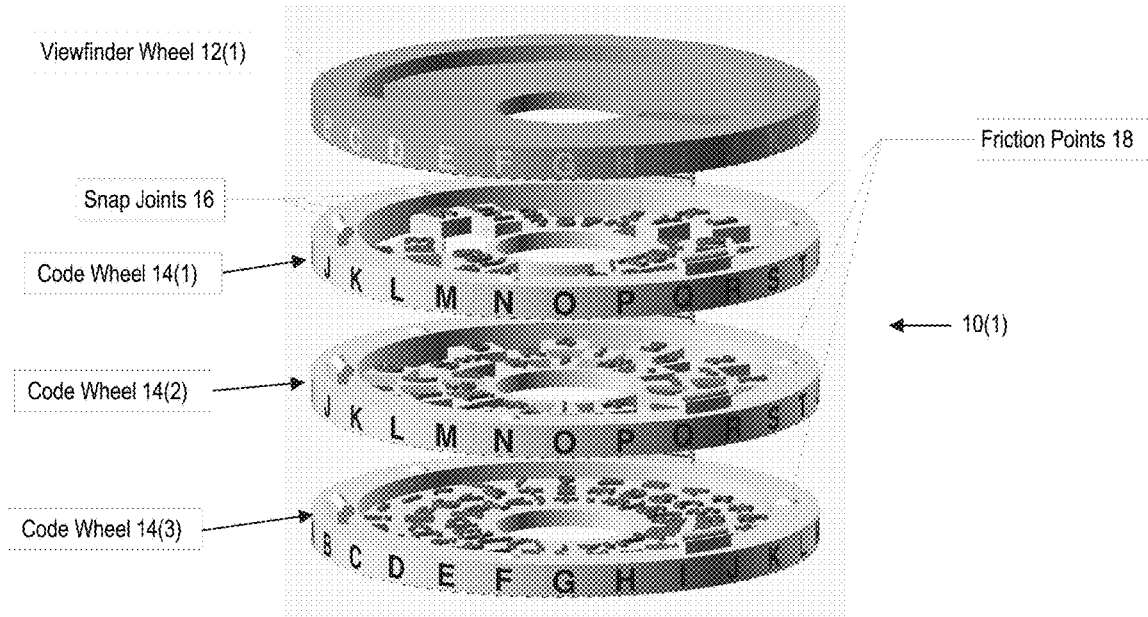
FIG. 1 is an exploded orthogonal view of an example of a security-code selection and recall device having four wheels and twenty-six sides with one key character per side and a six character viewfinder window for code sequences, suitable for generating sequences to satisfy password policies.
Figure 2:
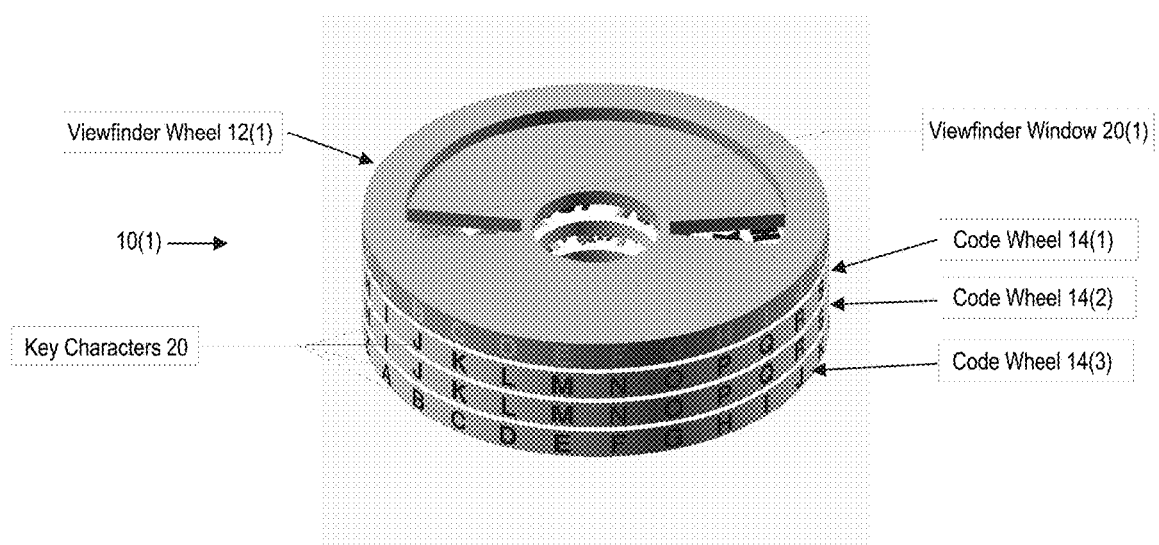
FIG. 2 is a perspective view of the security-code selection and recall device shown in FIG. 1.
Figure 3:
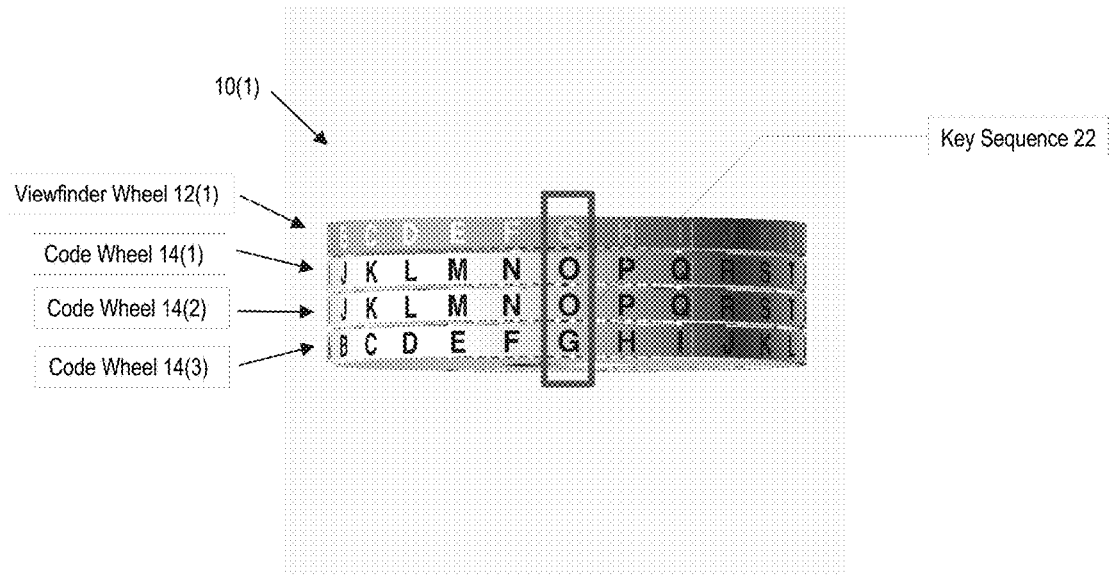
FIG. 3 is a side view of the security-code selection and recall device shown in FIG. 2 with an exemplary indication of how key sequence letters might be aligned and interpreted.
Figure 8A:
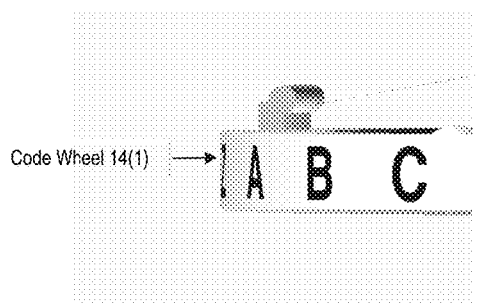
FIG. 8a is a side view of an exemplary snap joint of a portion of the security-code selection and recall device shown in FIG. 1.
Figure 8B:
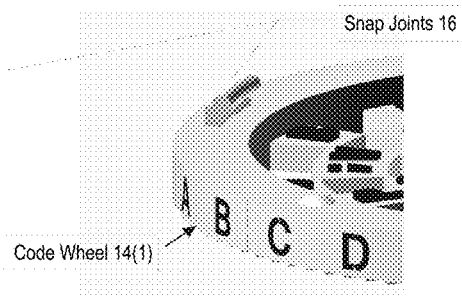
FIG. 8b is a perspective view of an exemplary snap joint of a portion of the security-code selection and recall device shown in FIG. 1.
Figure 9:
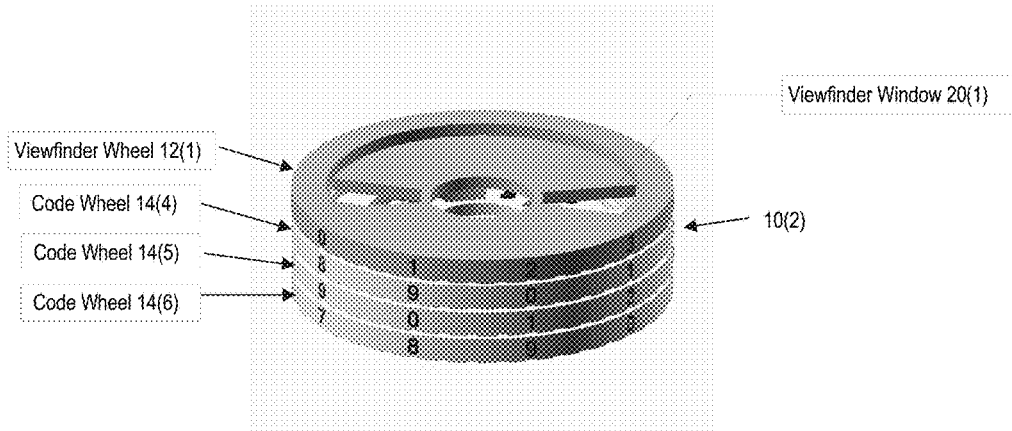
FIG. 9 is a perspective view of an example of another security-code selection and recall device having four-wheels and ten sides with one digit per side and a six digit viewfinder window suitable for numeric challenges and confirmation codes.
Figure 10:
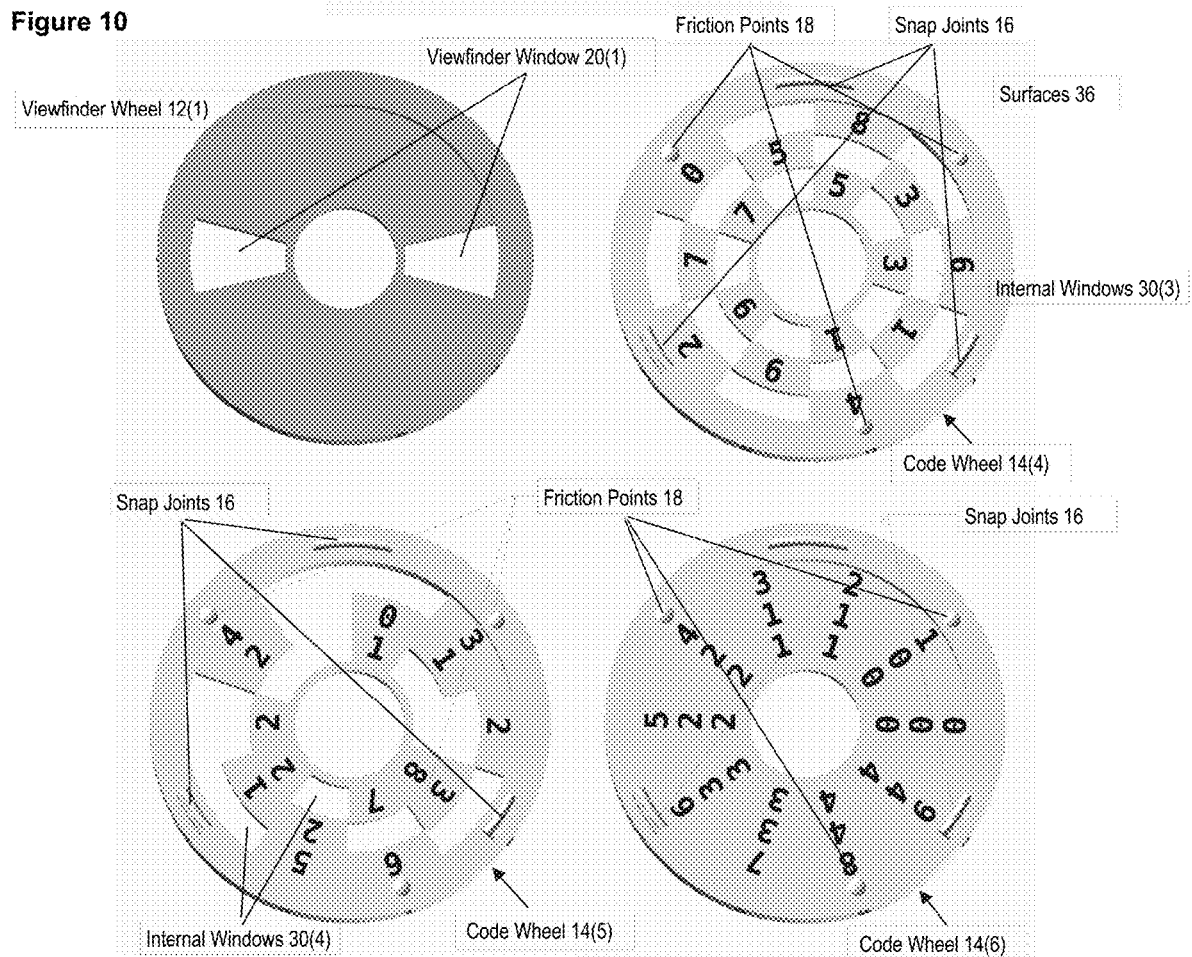
FIG. 10 is a top view of separated wheels of the security-code selection and recall device shown in FIG. 9.
Figure 12:
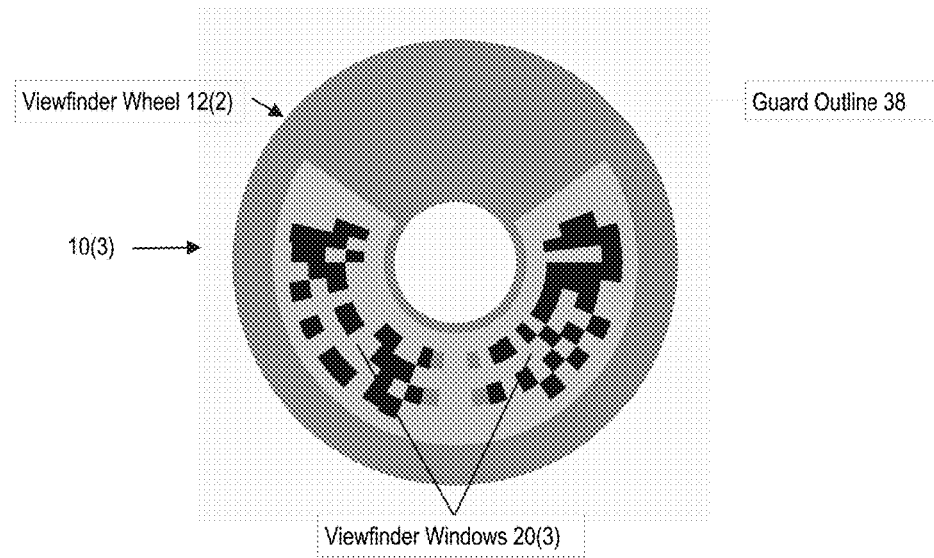
FIG. 12 is a top view of an example of yet another security-code selection and recall device having four-wheels and twenty-six sides with one key character per side and two viewfinder windows suitable for machine readable bit sequences that are translatable to confirmation codes in a format as viewable when presented to a scanning device.

Each of the code wheels 14(1)-14(3) has a circular shape and are configured to be interlocked and rotatably mounted together with respect to each other and viewfinder wheel 12(1) as shown by way of example in FIGS. 1-2, although other types and/or numbers of code wheels 14(4)-14(9) in other configurations may be used, such as shown, by way of example, in FIGS. 9-10 and in FIGS. 11-13. In particular, in this example as shown in FIGS. 1 and 6-8b, a plurality of annular snap joints 16 are spaced apart about a circumference of a surface of each of the code wheels 14(1)-14(3). The snap joints 16 are sized and positioned to movably fit within toroidal glide paths or tracks 36 about a circumference of another surface of each of the viewfinder wheel 12(1) and the code wheels 14(1)-14(2), although other manners for rotatably connecting the viewfinder wheel 12(1) and the code wheels 14(1)-14(2) can be used. For example, the security-code selection and recall device 10(1) may utilize a central post and hub arrangement that would both bind the viewfinder wheel 12(1) and the code wheels 14(1)-14(3) together and allow them to spin, however the depicted model conserves material and complexity. The snap joints 16 may also be designed and structured to fracture if the security-code selection and recall device 10(1) is disassembled, thus making the device tamper-evident. FIGS. 8a and 8b depict more closely the snap joints 16 from the side and in perspective, noting their toroidal shape designed to interlock with the glide path 36 in opposing surface of the viewfinder wheel 12(1) and the code wheels 14(1)-14(2).

Figure 4:
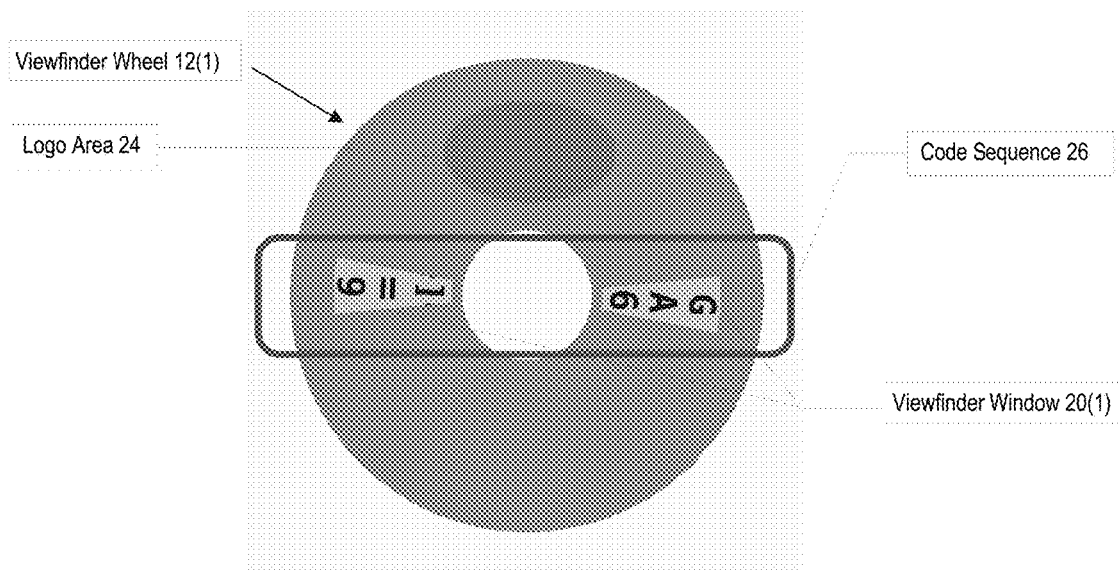
FIG. 4 is a top view of the security-code selection and recall device shown in FIG. 2 with an exemplary a six character code sequence visible through a viewfinder window.
Figure 5:
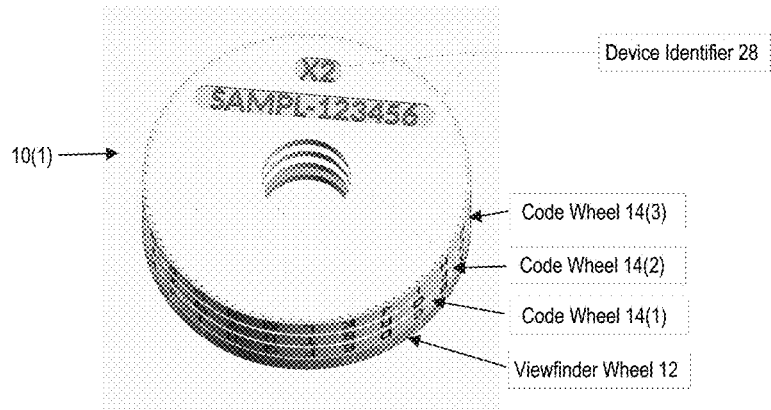
FIG. 5 is a bottom view of the security-code selection and recall device shown in FIG. 2 with an exemplary identifier visible.

Each of the code wheels 14(1)-14(3) also have notches 34 along the surface configured to detachably interact with the friction points 18 on an opposing surface of the viewfinder wheel 12(1) and the code wheels 14(1)-14(2), which help in the alignment of the code wheels 14(1)-14(3) for easier reading. The viewfinder wheel 12(1) and the code wheels 14(1)-14(3) may be made of a semi-rigid material, such as plastic by way of example only, in which the dome-shaped friction points 18 supply upward tension against the opposing surface of the viewfinder wheel 12(1) and the code wheels 14(1)-14(2). When encountering notches 34 on the surface of a neighboring wheel will provide varying resting and resistance points that result in a clicking sensation as the code wheels 14(1)-14(3) are rotated and repositioned between key sequences. Each resting position holds the viewfinder wheel 12(1) and the code wheels 14(1)-14(3) in place to minimize slippage between key characters and prevent ambiguous reading of the code sequence 26 through the viewfinder window 20(1) as shown in FIG. 4. The logo area 24 may be filled with one or more orientation and/or other symbol or symbols to illustrate how the security-code selection and recall devices 10(1) should be oriented when reading the code sequence 26 in the viewfinder windows 20(1).

Each of the viewfinder wheel 12(1) and code wheels 14(1)-14(3) have alphabetic characters distributed uniformly about an outer circumferential side as shown in FIGS. 1-3, 6, 8a, and 8b, although other types and/or number of alphabetic numeric, and/or symbolic characters may be used. Each of the code wheels 14(1)-14(3) can be rotated at a designated or otherwise identified location to align particular ones of the alphabetic key characters to a desired key sequence 22 which provides a particular code sequence 26 which are all correlated to the device identifier 28 for the uniquely generated the security-code selection and recall devices 10(1) in this example.

Figure 6:
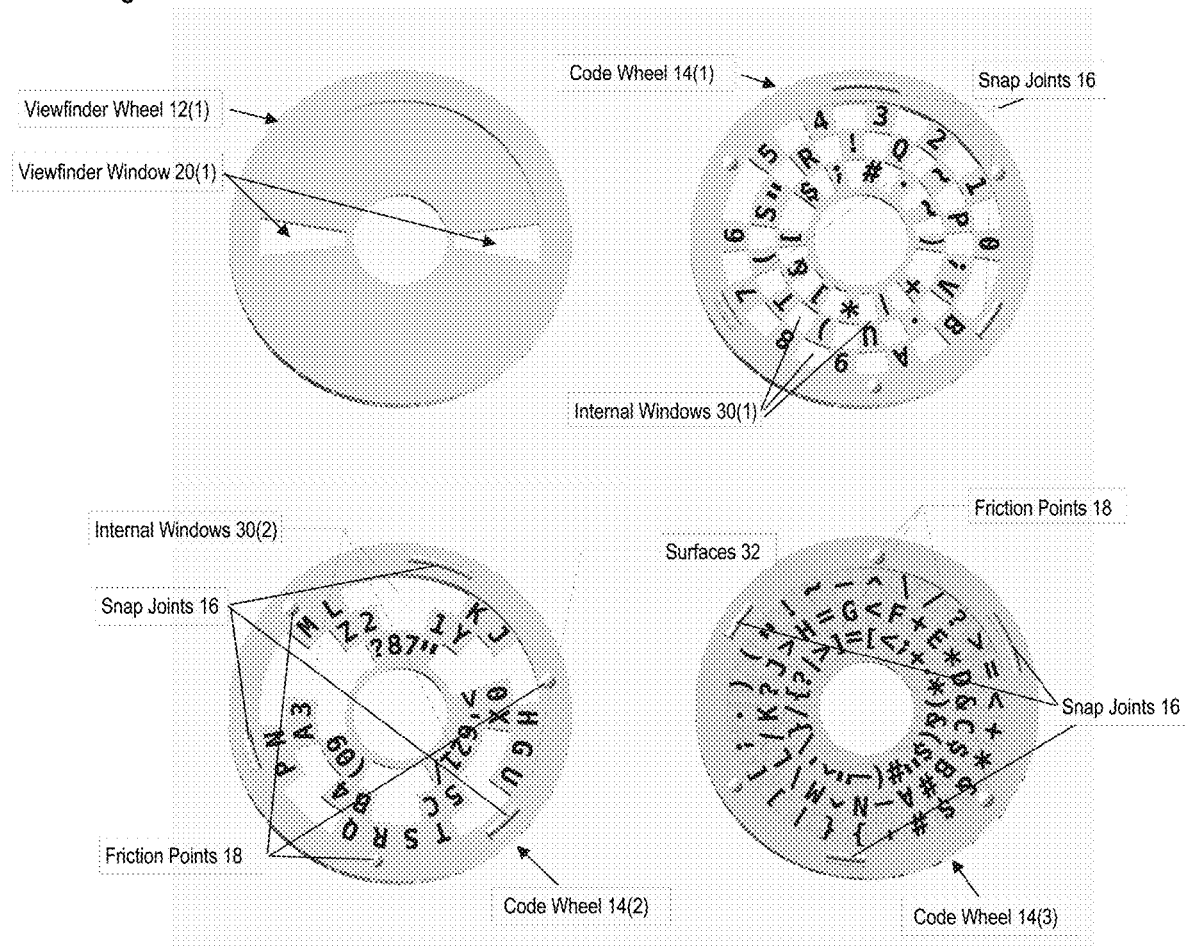
FIG. 6 is a top view of the separated wheels of the security-code selection and recall device shown in FIG. 1 exposing exemplary annular snap joints, windows, surfaces and friction points.
Figure 7:
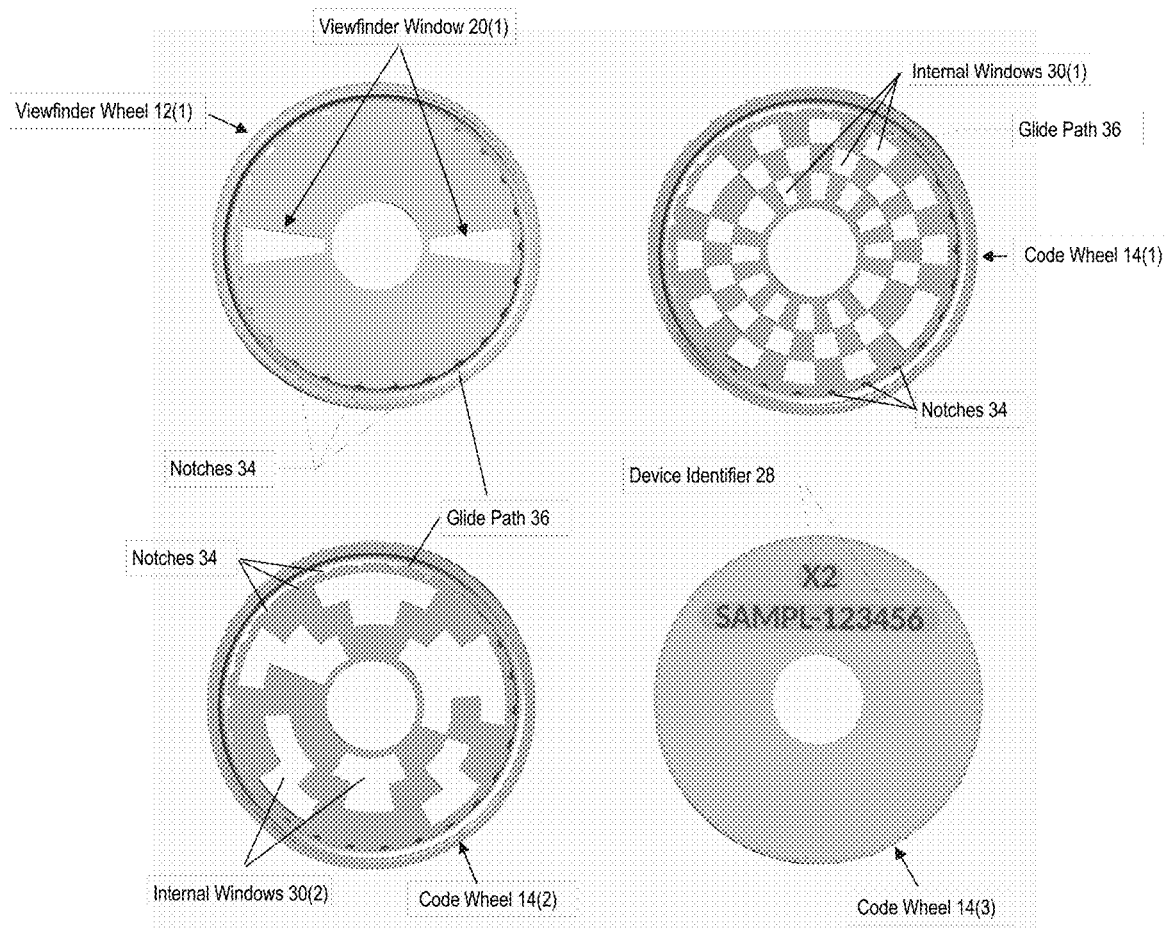
FIG. 7 is a bottom view of the separated wheels of the security-code selection and recall device shown in FIG. 1 exposing exemplary glide track and notches.

Each of the code wheels 14(1)-14(3) also have for each device a unique distribution of code symbols including alphabetic, numeric, and/or symbolic characters printed along one surface of each of the code wheels 14(1)-14(3) facing the viewfinder wheel 12(1) as shown in FIGS. 4 and 6 or an annular bar code or QR code as shown in FIGS. 12 and 13 for example. The alphabetic, numeric, and/or symbolic characters can be provided in a layout that ensures a standard password policy of one capital letter, one digit, and one special character for every six or other number of character sequence exposed by the viewfinder window 20(1). The alphabetic, numeric, and/or symbolic characters are distributed circumferentially in three ring portions along an inner surface spaced apart by internal windows 30(1) on code wheel 14(1) and differently shaped and positioned internal windows 30(2) on code wheel 14(2). The code wheel 14(3) at the base of the security-code selection and recall device 10(1) does not include any internal windows. A subset of the alphabetic, numeric, and/or symbolic characters in the different ring portions are visible when aligned with the viewfinder windows 20(1) as shown in FIG. 4 with the desired security code visible when the wheels are manually aligned to the desired key sequence 22. As shown in FIG. 13 other types of symbolic codes may be used and made visible. Support for the manufacture of modest volumes of individually unique security-code selection and recall devices, such as exemplary security-code selection and recall devices 10(1)-10(3), can be achieved through dual-extrusion FDM printing, although other types of manufacturing methods can be used. At larger volumes, injection molded blanks of code wheels 14(1)-14(9) could be marked with precision lasers, or fitted with die cut adhesive labels printed with code symbols, although other manners for placing the code symbols and other characters can be used. Although not strictly necessary for all applications, it is expected that each unique security-code selection and recall device, such as exemplary security-code selection and recall devices 10(1)-10(3), be labeled with a unique identifier known to the issuing authority; the sequence, and potentially the layout and types of symbols on each security-code selection and recall device being unique to the device identifier 28. This device identifier 28, or a reference to it, being normally on the security-code selection and recall device, is intended to be referenced by the owner and the issuing authority in case a replacement or ownership confirmation is required. Additionally, the shape of the viewfinder windows, such as viewfinder windows 20(1)-20(3) as shown in FIGS. 1-2, 4, 6, 9-10, and 12-13, can be varied to permit different amounts of the alphabetic, numeric, and/or symbolic characters to be visible in different manners. For example, the T-shaped viewfinder windows uniquely provide two sets of unique characters along each direction of the T for exemplary situations where more than one security code may be required.

A device identifier 28 is provided on the outer surface of the code wheel 14(3) or other base code wheel, although the device identifier could be at other locations, such as on the outer surface of the viewfinder wheel 12(1), such as in the logo area 24 or elsewhere. The device identifier 28 can be in a format at the discretion of the issuing authority 50.

Referring to FIGS. 9-10, an alternative example of a security-code selection and recall devices 10(2) is illustrated. The security-code selection and recall devices 10(2) is the same in structure and operation as the security-code selection and recall devices 10(1), except as otherwise illustrated and described herein.

In this example, the security-code selection and recall devices 10(2) comprises viewfinder wheel 12(1) and code wheels 14(4)-14(6) which are structured and rotatably connected in the same manner as viewfinder wheel 12(1) and code wheels 14(1)-14(3). In this example, each of the viewfinder wheel 12(1) and code wheels 14(4)-14(6) have ten numeric characters distributed uniformly about an outer circumferential side as shown in FIG. 9, although other types and/or number of alphabetic numeric, and/or symbolic characters may be used. Each of the code wheels 14(4)-14(6) can be rotated at a designated or otherwise identified location to align particular ones of the numeric key characters to a desired key sequence 22 comprising four numeric characters to align the code wheels 14(4)-14(6) to display a six digit security code in the viewfinder window 20(1). Again another shaped viewfinder window, such as the one shown in FIG. 11, can be used to reveal other security codes. Additionally, in this example numeric characters are distributed circumferentially in three ring portions along an inner surface spaced apart by internal windows 30(3) on code wheel 14(4) and differently shaped and positioned internal windows 30(4) on code wheel 14(5). The code wheel 14(6) at the base of the security-code selection and recall device 10(2) does not include any internal windows. A subset of the numeric characters in the different ring portions are visible when aligned with the viewfinder windows 20(1) as shown in FIG. 9 with the desired security code visible when the wheels are manually aligned to the desired key sequence 22.

Referring to FIGS. 12-13, an alternative example of a security-code selection and recall devices 10(3) is illustrated. The security-code selection and recall devices 10(3) is the same in structure and operation as the security-code selection and recall devices 10(1), except as otherwise illustrated and described herein.

In this example, each of the viewfinder wheel 12(2) and code wheels 14(7)-14(9) have alphabetic, numeric, or other symbolic characters distributed uniformly about an outer circumferential side in the same manner as security-code selection and recall devices 10(1) and 10(2). Each of the code wheels 14(7)-14(9) can be rotated at a designated or otherwise identified location to align particular ones of the alphabetic key characters to a desired key sequence 22.

Each of the code wheels 14(7)-14(9) also have code symbols including an annular bar code or QR code that is machine readable printed along one surface facing the viewfinder as shown in FIG. 13. The annular bar code or QR code is distributed circumferentially in two ring portions along an inner surface spaced apart by internal windows 30(5) on code wheel 14(7) and differently shaped and positioned internal windows 30(6) on code wheel 14(8). The code wheel 14(9) at the base of the security-code selection and recall device 10(9) does not include any internal windows. A subset of the annular bar code or QR code in the different ring portions are visible when aligned with the viewfinder windows 20(3) as shown in FIG. 12 with the desired portion of the annular bar code or QR code visible when the code wheels 14(7)-14(9) are manually aligned to the desired key sequence 22.

In this example, each surface of the code wheels 14(7)-14(9) reveals four bits of information, and a full viewfinder would provide 112 bits or fourteen bytes of information as a confirmation code. Other examples may narrow or widen the viewfinder windows 20(3), or provide a different number of bits on each surface. The viewfinder windows 20(3), are surrounded by a guarding outline 38 of a solid color and are separated by a predictable calibration pattern 42 to enable the recognition of the scanned zone. The calibration pattern 42 provides a reference for the size of the bit pattern to be expected on the surfaces on code wheels 14(7)-14(9) visible through internal windows 30(5)-30(6) based on the alignment of code wheels 14(7)-14(9). Note that the guarding outline 38 comprises edge boundaries 40 on the viewfinder wheel 12(3), and same colored areas on each of the code wheels at the outer perimeter 44 and inner hub 46. The resulting outline of color better enables readability of the security-code selection and recall device 10(3), but may be superfluous for some applications and is not a necessary feature of all instances. The viewfinder windows 20(3) are fashioned wide enough such that the outer perimeter 44 and inner hub 46 on all code wheels 14(7)-14(9) are always visible.

A device identifier may be provided on the outer surface of the code wheel 14(9) or other base code wheel, although the device identifier could be at other locations, such as on the outer surface of the viewfinder wheel 12(3), such as in the logo area 24 or elsewhere. The device identifier 28 can be in a format at the discretion of the issuing authority 50.

Figure 14:
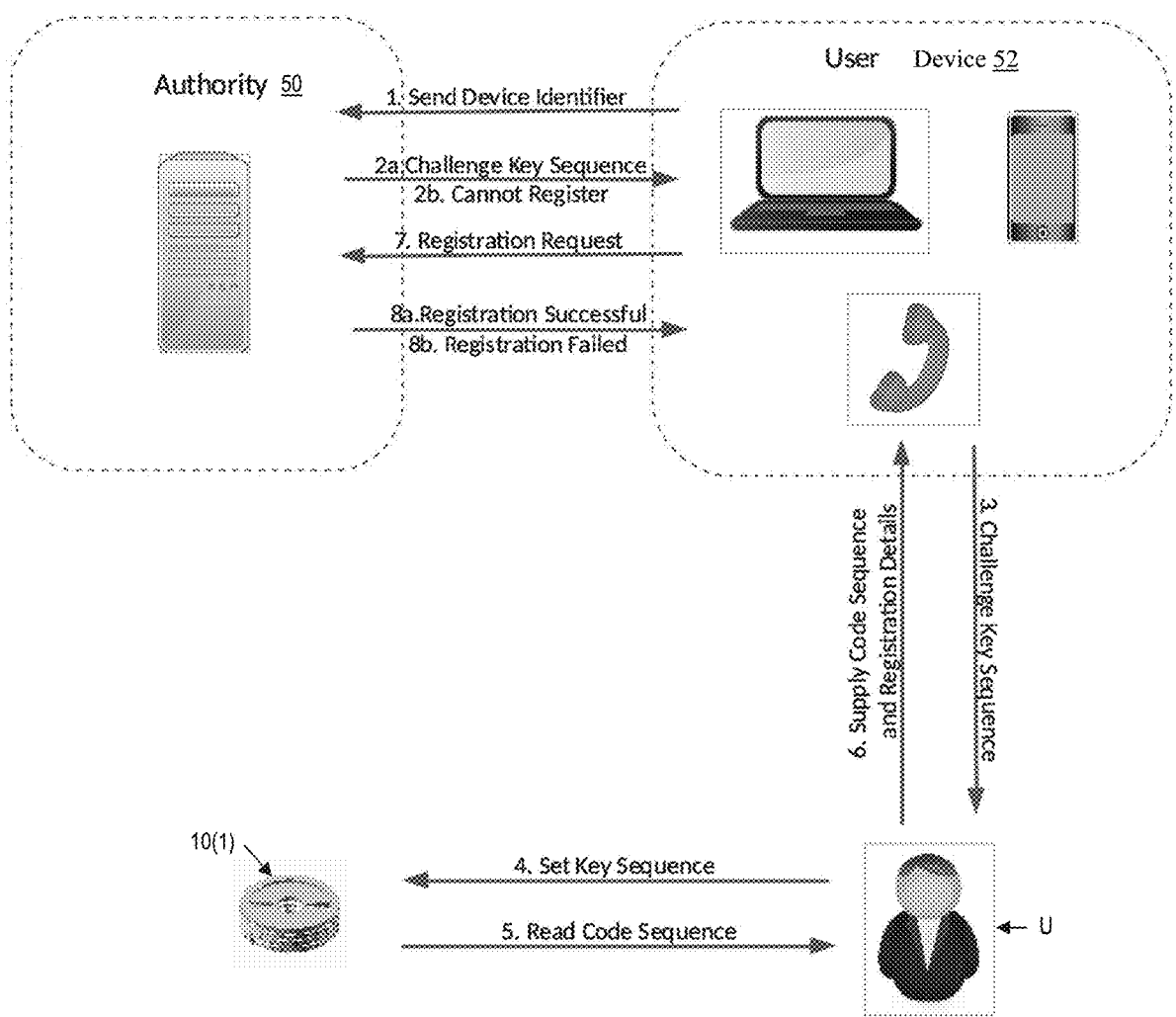
FIG. 14 is a flow diagram of an exemplary method for registering a security-code selection and recall device with an authority controlled system and confirming that a user has access to the security-code selection and recall device.
Figure 15:
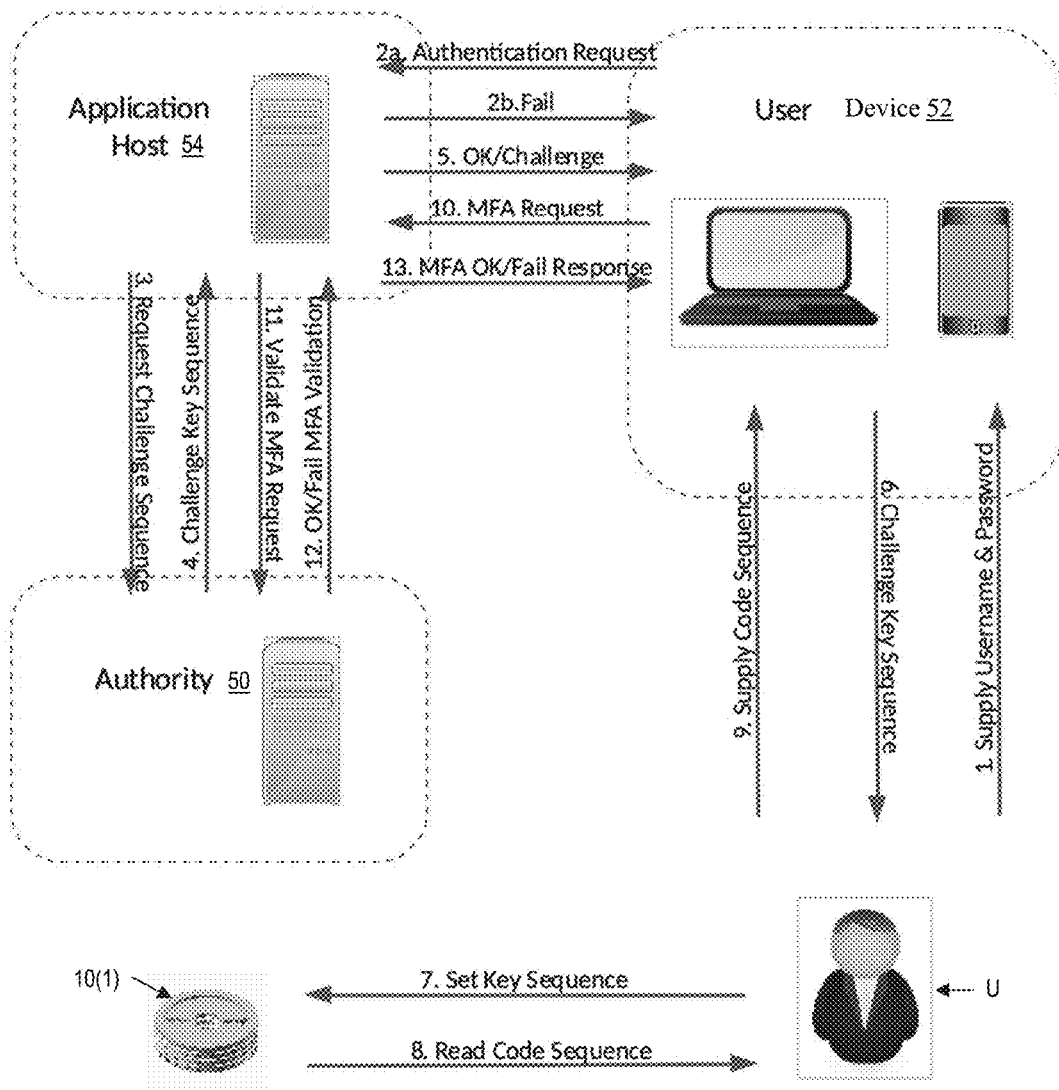
FIG. 15 is a flow diagram of an exemplary method for multi-factor authentication in which the security-code selection and recall device serves as a second factor.
Figure 16:
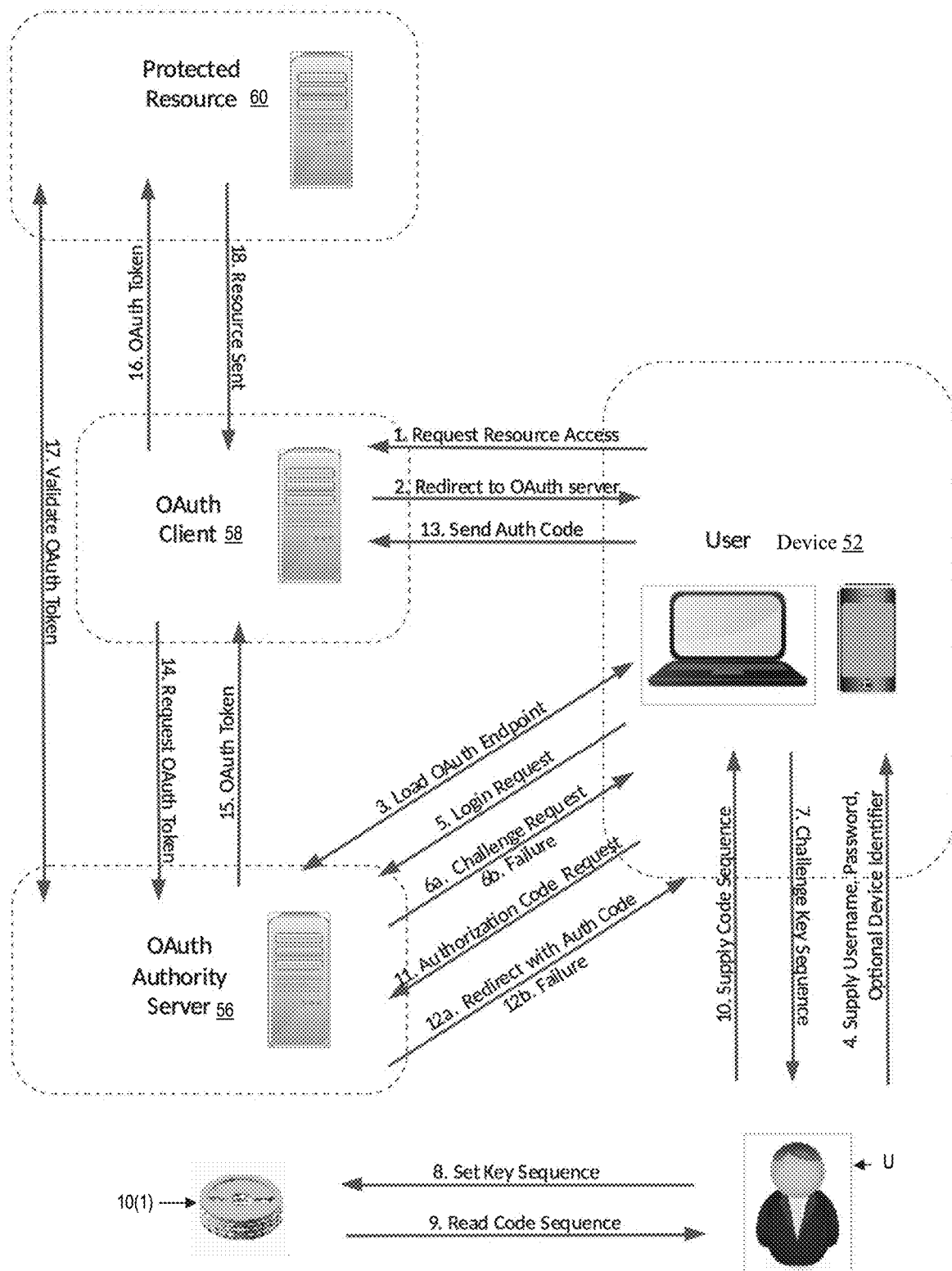
FIG. 16 is a flow diagram of an exemplary method for a third-party delegation in which the security-code selection and recall device serves as an authentication factor.

Referring to FIGS. 14-16, various exemplary methods for using one of the exemplary security-code selection and recall devices 10(1)-10(3). Although in each of these examples, the security-code selection and recall device 10(1) is illustrated and described, other types of the security-code selection and recall devices may be used, such as the security-code selection and recall devices 10(2) or 10(3) by way of example. In one example shown in FIG. 14, the environment may comprise an authority server device 50 and a user device 52, such as a laptop computer or smartphone by way of example only, for a user with the security-code selection and recall device 10(1), although the environment may comprise other types and/or numbers of other systems, devices, components, and/or other elements in other configurations, such as one of the security-code selection and recall devices 10(2) and 10(3) by way of example only. In another example shown in FIG. 15, the environment may comprise the security-code selection and recall devices 10(1), the authority server device 50 and the user device 52 as well as an application host server device 54, although the environment may comprise other types and/or numbers of other systems, devices, components, and/or other elements in other configurations, such as one of the security-code selection and recall devices 10(2) and 10(3) by way of example only. In another example shown in FIG. 16, the environment may comprise the security-code selection and recall devices 10(1), the user device 52, an OAuth authority server device 56, an OAuth client device 58, and a protected resource server device 60, although the environment may comprise other types and/or numbers of other systems, devices, components, and/or other elements in other configurations, such as one of the security-code selection and recall devices 10(2) and 10(3) by way of example only.

The authority server device 50, the user device 52, the application host server device 54, the OAuth authority server device 56, the OAuth client device 58, and the protected resource server device 60 may each may include a central processing unit (CPU) or processor, a memory, input/display device interface, and/or an input/output system or I/O system, which are coupled together by a bus or other link. Although the exemplary environments are described and illustrated herein, other types and numbers of systems, devices, components, and/or elements in other configurations can be used. It is to be understood that the systems of the examples described herein are for exemplary purposes, as many variations of the specific hardware and software used to implement the examples are possible, as will be appreciated by those skilled in the relevant art(s).

One or more of the authority server device 50, the user device 52, the application host server device 54, the OAuth authority server device 56, the OAuth client device 58, and the protected resource server device 60 can be standalone devices or integrated with one or more other devices or apparatuses, such as one of the server devices, for example. Moreover, one or more of the devices of the computing apparatus in these examples can be in a same or a different communication network including one or more public, private, or cloud networks, for example.

The examples also may be embodied as non-transitory computer readable media having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

Referring to FIG. 14, an exemplary method for registering a security-code selection and recall device with an authority controlled system and confirming that a user has access to the security-code selection and recall device is illustrated. In step 1, the user using of a user device 52 may have received a security-code selection and recall device 10(1) with a unique distribution or layout of the alphabetic, numeric, or symbolic characters, a unique layout of the internal windows 30(1) and 30(2) and/or viewfinder window 20(1), and a unique device identifier 28 managed by the issuing authority server device 50 in this example. To begin, the user at the user device 52 contacts the issuing authority server device 50 with the device identifier 28 to start the registration and confirmation process.

In step 2a, the issuing authority server device 50 determines whether the received device identifier is known. If in step 2a, the issuing authority server device 50 determines the received device identifier is known, then the issuing authority server device 50 returns a challenge key sequence and a registration request form to the user device 50. If in step 2a, the issuing authority server device 50 determines the received device identifier is not known, then the issuing authority server device 50 returns a message to the user device 52 that the device identifier 28 is not available for registration.

In step 3-4, the key sequence 22 in the challenge request is read by the user who in step 4 manipulates the code wheels 14(1)-14(3) and viewfinder wheel 12(1) by aligning key characters 20 on the outer circumferential side of the viewfinder wheel 12(1) and code wheels 14(1)-14(3) at a designated location to form the key sequence 22 as shown in FIG. 4, e.g. "GOOG" is the key sequence 22.

In steps 5-6, the user reads the code sequence 26 in the viewfinder window 20(1) and enters the code sequence 26 along with user identification and/or other requested information into the registration form.

In step 7, the user device 52 transmits the submits the code sequence 26 along with the user identification and/or other requested information in the registration form to the issuing authority server device 50 for verification for registration.

If the issuing authority server device 50 is able to verify the code sequence 26, then in step 8a the user identification information is recorded and a confirmation is transmitted to the user device 52. If the issuing authority server device 50 is not able to verify the code sequence 26, then in step 8b the user identification information is not recorded and a failure notification is transmitted to the user device 52.

Referring to FIG. 15, an exemplary method for multi-factor authentication in which the security-code selection and recall device 10(1) serves as a second factor in an authentication scheme for an information system is illustrated. In this exemplary environment, all connections between the authority server device 50, the user device 52, and the application host server device 54 are likely secured with TLS or other encryption, and could be for example local wired, wireless or wide area connections. The protocols underlying transport are in any case, not relevant to this exemplary method, although one skilled in the art of secure networking would have clear preference for certain technologies given a particular application. The location of the issuing authority server device 50 and the application host server device 54 is not restricted to separate physical machines or locations and could for example be integrated on one machine or in separate data centers.

At step 1, the user at the user device 52 inputs credential data including a username and password, and if required their device identifier 28 for the security-code selection and recall device 10(1), to a native or web interface of the user device 52 to request access to, for example, an application or other data on the application host server device 54, although other types and/or amounts of authentication and/or other information may be provided.

At step 2a, the application host server device 54 receives the credential data from the user device and checks the validity of the username and password. If in step 2b, the application host server device 54 determines any part of the credential data is invalid, then the application host server device 54 transmits a failure notification back to the user device 52. If the application host server device 54 determines the credential data is valid, then the application host server device 54 proceeds to step 3.

At step 3, the application host server device 54 requests a key sequence 22 for a challenge request from the issuing authority server device 50 for the received device identifier related to the username and password which in this example would have been already registered as described, for example, in the exemplary method with reference to FIG. 14.

At step 4, the application host server device 54 receives, in response to the request, the key sequence 22 for the challenge request from the issuing authority server device 50 for the received device identifier related to the username and password. One example of a best practice for the issuing authority server device 50 would be to avoid sending a repeat key sequence 22 in a challenge request, which could be exploited by a persistent, malicious observer. Along with the key sequence 26, the application host server device 54 in this example also receives a request identifier to be sent along with a received code sequence in step 11 as described below.

At step 5, the application host server device 54 creates and transmits a challenge web page, message or other request with the key sequence 22 to the requesting user device 52.

At step 6, the key sequence 22 is read by a user from a user interface of the user device 52. At step 7, the user manipulates the security-code selection and recall device 10(1) to align key characters on the outer circumferential side of the viewfinder wheel 12(1) and code wheels 14(1)-14(3) at the designated location into the key sequence 22, shown by way of example in FIG. 3. At step 8, the user reads a code sequence 26 through the viewfinder window 20(1) as shown by way of example in FIG. 4. At step 9, the user enters the code sequence 26 into the user interface of the user device 52 as directed. Note that the user interface of the user device 52 could, for example, prompt for forward or reverse entry of the code sequence 26, only part of the code sequence 26, or in the case of multiple viewfinder windows 20(1), which one or ones of the viewfinder windows should be used. Variations are possible at the discretion of the issuing authority server device 50 depending on the security and usability requirements of any given application.

At step 10, the application host server device 54 receives from the user interface of the user device 52 a multi-factor authentication request comprising the code sequence 26, although other types of authentication and/or other information may be received.

At step 11, the application host server device 54 translates the multi-factor authentication request comprising the code sequence 26 into a request for the issuing authority server device 50, containing the request identifier of the original challenge sequence request 22 and the code sequence 26 sent by the user device 52.

At step 12, the issuing authority server device 50 determines whether the code sequence 26 or portion of the code sequence 26. If the issuing authority server device 50 determines the code sequence 26 or portion of the code sequence 26 is valid, then an approved or OK response message is received by the application host server device 54. If the issuing authority server device 50 determines the code sequence 26 or portion of the code sequence 26 is invalid, then a failure response message is sent to the application host server device 54.

At step 13, the application host server device 54 translates the received response message into an HTTP reply or other appropriate message which is transmitted to the user device 52 and then if approved or Ok then the user device 52 may access the requested application or other data at the application host server device 54 in this example.

Referring to FIG. 16, an exemplary method for a third-party delegation in which the security-code selection and recall device 10(1) serves as an authentication factor is illustrated. In this example, an authentication scheme frequently employed to delegate a third-party access to a protected resource at the protected resource server device 60 which is controlled by an issuing authority server device 50, in which the security-code selection and recall device 10(1) plays a role in authenticating with the issuing authority server device 50 server. OAuth2 and OpenID are information industry standards that describe these third-party delegation methods, utilized when a user wishes to have another entity "log in" as the user to access some protected resource, but not actually have the user's credentials.

At step 1, the user interface of the user device 52 is pointed at or otherwise directed to a OAuth or third party client device 58 that the user wishes to grant access to their protected resource at the protected resource server device 60. This redirection may, for example, be by an application that needs access immediately or explicitly connected by the user with the intent to grant access to the third party whenever they need the protected resource.

At step 2, OAuth or third party client device 58 redirects the user interface (typically an HTTP/Web interface but potentially an HTTP aware native client) of the user device 52 to the issuing authority server device 50. At step 3, the OAuth authority server device 56 is accessed and loads a login page for the user interface of the user device 52.

At step 4, the user enters into the user device 52 credential data which in this example may include one or more of their username, password and device identifier to the login page. Note that, the OAuth authority server device 56 may: only require the user's username, and rely on knowing the associated (registered) device identifier 28 to send the key sequence 22 in a challenge request for which the related code sequence 26 will suffice as a "password" in subsequent steps; require both the username and password before looking up and sending a challenge request with the key sequence 22 for the associated device identifier 28; or not have knowledge of and require a registered device identifier 28 in addition to, or instead of, a user name and/or password. All options are to be expected, depending on the application and security and usability interests of the authority server device 56 and the protected resource owner.

At step 5, the user device 52 sends the login details to the OAuth authority server device 56 which proceeds to determine if the login details are valid. If the OAuth authority server device 56 determines the login details are valid, then the at step 6a a challenge request with the key sequence 22 is generated and transmitted to the user device 52. In this step, the best practice of the OAuth authority server device 56 would be to avoid sending a repeat key sequence 22, which could be exploited by a persistent, malicious observer. Along with the key sequence 22, OAuth authority server device 56 sends a request identifier which would be sent along with the code sequence reply in step 11. If the OAuth authority server device 56 determines the login details are invalid because, for example, the username does not exist, the password is incorrect, the device identifier 28 is not associated with the username, or the device identifier 28 does not exist or is otherwise invalid, then in step 6b a failure notification message is sent to the user device 52 and this example of the process ends.

At step 7, the challenge sequence 26 is read by a user from a user interface of the user device 52. At step 8, the user manipulates the security-code selection and recall device 10(1) to aligns key characters on the outer circumferential side of the viewfinder wheel 12(1) and code wheels 14(1)-14(3) at the designated location into the key sequence 22, shown by way of example in FIG. 3. At step 9, the user reads the code sequence 26 through the viewfinder window 20(1)

as shown by way of example in FIG. 4. At step 10, the user enters the code sequence 26 into the user interface of the user device 52 as directed.

At step 11, the authorization code request, containing the code sequence 26 and request identifier, generated back in step 6a, is sent by the client device 52 to the OAuth authority server device 56. If the code sequence 26 is correct for the given key sequence 22 and the request identifier, then in step 12a the OAuth authority server device 56 generates an authorization code, usable by the third-party client, and sends a the authorization code in a redirect message back to the user interface of the user device 52. In step 13, the user device 52 redirects the authorization code back to the OAuth client device 58. If the code sequence is incorrect for the given key sequence and request identifier, then in step 12b a failure notification message is sent back to the user interface of the user device 52.

At step 14, the OAuth client device 58 requests an OAuth token from the OAuth authority server device 58 in exchange for the authorization code. This OAuth token is an opaque entity to the OAuth client device 58, but is understood by the protected resource server device 60 and the OAuth authority server device 58.

At step 15, the OAuth token is used as a substitute for user credentials and is handed back to the OAuth client device 58, assuming it is valid. A failure here is possible and could indicate the presence of a malicious OAuth client device 58 trying to pass off a fake authorization code.

At step 16, the OAuth token is sent to the protected resource server device 60, which validates the OAuth token by communication with the OAuth authority server device 58 in step 17. Assuming the OAuth code is valid and the scope granted to the OAuth code are appropriate to the request, the protected resource is sent to the OAuth client device 58 in step 18.

Accordingly, as illustrated and described by way of the examples herein, this technology provides a number of advantages including a secure and easy to use security-code selection and recall device for applications, such as user password selection and multi-factor authentication by way of example.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A security-code selection and recall device comprising:
a viewfinder wheel with at least one viewfinder window;
two or more code wheels rotatably coupled together with the viewfinder wheel about a common axis;
a plurality of characters spaced about a circumferential outer side of each of the viewfinder wheel and the two or more code wheels; and
a plurality of code symbols located in two or more regions of a surface of each of the code wheels, each of the regions is spaced out a different distance from the common axis; and
a plurality of internal windows in at least one of the code wheels adjacent the viewfinder wheel, wherein alignment of one of the characters of each of the viewfinder wheel and the two or more code wheels at a key sequence location reveals through the viewfinder window and one or more of the internal windows a code sequence comprising a subset of the code symbols.

2. The device as set forth in claim 1 further comprising:
two or more snap joints positioned about a circumference of the surface of each of the code wheels; and
a toroidal glide path about a circumference of another surface of the viewfinder wheel and the code wheels, the two or more snap joints configured to movably fit within the glide path and detachably interlock.

3. The device as set forth in claim 1 further comprising:
a plurality of notches positioned about the circumference of the toroidal glide path of the viewfinder wheel and the code wheels; and
two or more friction points extending from the surface of each of the code wheels, wherein each of the two or more friction points are configured to detachably interact with one of the notches.

4. The device as set forth in claim 1 wherein the viewfinder wheel has at least two of the viewfinder windows.

5. The device as set forth in claim 1 wherein the two or more code wheels further comprise three or more of the code wheels with the plurality of internal windows in at least two of the code wheels adjacent to the viewfinder wheel.

6. The device as set forth in claim 5 wherein the plurality of internal windows on one of the least two of the code wheels has a different shape and location than the internal windows on the other one of the least two of the code wheels.

7. The device as set forth in claim 1 wherein the plurality of code symbols located in the two or more regions of the surface of each of the code wheels are located in three or more regions, wherein each of the regions has a different type of the code symbols.

8. The device as set forth in claim 1 wherein the code symbols further comprises two or more of alphabetic, numeric, or symbolic characters.

9. The device as set forth in claim 1 wherein the code symbols further comprise an annular bar code or QR code.

10. The device as set forth in claim 9 wherein the viewfinder wheel further comprises:
at least two of the viewfinder windows;
a calibration pattern between the at least two of the viewfinder windows; and
an edge boundary region adjacent an opposing side of each of the at least two of the viewfinder windows from the calibration pattern.

11. A method for making a security-code selection and recall device, the method comprising:
providing a viewfinder wheel with at least one viewfinder window;
rotatably coupling together two or more code wheels with the viewfinder wheel about a common axis;
placing a plurality of characters spaced about a circumferential outer side of each of the viewfinder wheel and the two or more code wheels; and placing a plurality of code symbols located in two or more regions of a surface of each of the code wheels, each of the regions is spaced out a different distance from the common axis; and forming a plurality of internal windows in at least one of the code wheels adjacent the viewfinder wheel, wherein alignment of one of the characters of each of the viewfinder wheel and the two or more code wheels at a key sequence location reveals through the viewfinder window and one or more of the internal windows a code sequence comprising a subset of the code symbols.

12. The method as set forth in claim 11 further comprising:

positioning two or more snap joints about a circumference of the surface of each of the code wheels; and forming a toroidal glide path about a circumference of another surface of the viewfinder wheel and the code wheels, the two or more snap joints configured to movably fit within the glide path and detachably interlock.

13. The method as set forth in claim 11 further comprising:

positioning a plurality of notches about the circumference of the toroidal glide path of the viewfinder wheel and the code wheels; and forming two or more friction points that extend from the surface of each of the code wheels, wherein each of the two or more friction points are configured to detachably interact with one of the notches.

14. The method as set forth in claim 11 wherein the viewfinder wheel has at least two of the viewfinder windows.

15. The method as set forth in claim 11 wherein the two or more code wheels further comprise three or more of the code wheels with the plurality of internal windows in at least two of the code wheels adjacent to the viewfinder wheel.

16. The method as set forth in claim 15 wherein the plurality of internal windows on one of the least two of the code wheels has a different shape and location than the internal windows on the other one of the least two of the code wheels.

17. The method as set forth in claim 11 wherein the plurality of code symbols located in the two or more regions of the surface of each of the code wheels are located in three or more regions, wherein each of the regions has a different type of the code symbols.

18. The method as set forth in claim 11 wherein the code symbols further comprises two or more of alphabetic, numeric, or symbolic characters.

19. The method as set forth in claim 11 wherein the code symbols further comprise an annular bar code or QR code.

20. The method as set forth in claim 19 wherein providing the viewfinder wheel further comprises:

forming at least two of the viewfinder windows;

placing a calibration pattern between the at least two of the viewfinder windows; and forming an edge boundary region adjacent an opposing side of each of the at least two of the viewfinder windows from the calibration pattern.

* * * * *